(12) United States Patent
Zavesky et al.

(10) Patent No.: US 11,379,615 B2
(45) Date of Patent: Jul. 5, 2022

(54) EVENT-BASED COMMUNITY CREATION FOR DATA SHARING PLATFORM

(71) Applicant: AT&T Intellectual Property I, L.P., Atlanta, GA (US)

(72) Inventors: Eric Zavesky, Austin, TX (US); Robert Gratz, Lockhart, TX (US); Jason Decuir, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 293 days.

(21) Appl. No.: 16/184,964

(22) Filed: Nov. 8, 2018

(65) Prior Publication Data

US 2020/0151360 A1 May 14, 2020

(51) Int. Cl.
*G06F 21/62* (2013.01)
*G06F 21/60* (2013.01)
*G06F 16/11* (2019.01)

(52) U.S. Cl.
CPC ........ *G06F 21/6254* (2013.01); *G06F 16/125* (2019.01); *G06F 21/604* (2013.01)

(58) Field of Classification Search
CPC ...... G06F 21/604; G06F 21/62; G06F 21/606; G06F 21/6254; G06F 16/125; G06F 21/6218; G06F 17/40
See application file for complete search history.

(56) References Cited

U.S. PATENT DOCUMENTS

| | | |
|---|---|---|
| 8,595,798 B2 | 11/2013 | Anand et al. |
| 8,635,673 B2 | 1/2014 | Anand et al. |
| 8,989,696 B1 * | 3/2015 | Cona .................. G01C 21/3415 455/418 |
| 9,875,239 B2 | 1/2018 | Victor |
| 9,967,319 B2 | 5/2018 | Savelieva et al. |
| 9,973,484 B2 | 5/2018 | Reid et al. |
| 10,033,702 B2 | 7/2018 | Ford et al. |
| 2014/0132772 A1 * | 5/2014 | Billau .................. H04L 63/10 348/159 |
| 2015/0373040 A1 | 12/2015 | Sander et al. |
| 2016/0026819 A1 | 1/2016 | Malik et al. |
| 2016/0350685 A1 | 12/2016 | Helbing |
| 2018/0063205 A1 | 3/2018 | French |
| 2018/0083843 A1 | 3/2018 | Sambandam |

(Continued)

FOREIGN PATENT DOCUMENTS

CN 106777110 A 5/2017

*Primary Examiner* — Olugbenga O Idowu (57) ABSTRACT

Methods, computer-readable media, and processing systems are disclosed for establishing a data sharing community for an event of an event type. For example, a processing system including at least one processor may detect, via at least one data source device, a trigger condition for an event of an event type, and establish a data sharing community for the event, the data sharing community including a plurality of data sources, the plurality of data sources including the at least one data source device, and a plurality of data consumers, where the establishing includes setting respective permission levels for the data consumers. The processing system may further collect data from the plurality of data sources in accordance with the event type, and provide at least a first portion of the data to at least a first data consumer in accordance with a respective permission level of at least the first data consumer.

20 Claims, 4 Drawing Sheets

(56) References Cited

U.S. PATENT DOCUMENTS

2018/0182052 A1 6/2018 Panagos
2019/0310919 A1* 10/2019 Natanzon .............. G06F 3/0604
2020/0285872 A1* 9/2020 Surendran .............. G16H 50/20

* cited by examiner

EVENT-BASED COMMUNITY CREATION FOR DATA SHARING PLATFORM

The present disclosure relates generally to network-based data storage systems, and more particularly to methods, computer-readable media, and processing systems for establishing a data sharing community for an event of an event type.

BACKGROUND

Many information systems involve a combination (join) of data sets from multiple data owners. In one example, a requesting entity, such as a data analyst, may gain access to a single data set through an approval chain. For example, the entity may declare a need for data X, and the owner of data X may grant access, e.g., after obtaining the entity's submission to a non-disclosure agreement, various terms and conditions, etc. Access credentials may be provided to the entity, and then the entity may access the data, e.g., for a limited time until the access credentials expire. This may be repeated for different data sets possessed by different data owners. There may be some heuristics around the timespans for having access to the data, the time periods covered by the data, and hierarchical approvals.

SUMMARY

In one example, the present disclosure describes a method, computer readable medium, and processing system for establishing a data sharing community for an event of an event type. For instance, in one example, a processing system including at least one processor may detect, via at least one data source device, a trigger condition for an event of an event type, and establish a data sharing community for the event, the data sharing community including a plurality of data sources, the plurality of data sources including the at least one data source device, and a plurality of data consumers, where the establishing includes setting respective permission levels for the plurality of data consumers. The processing system may further collect data from the plurality of data sources in accordance with the event type, and provide at least a first portion of the data from the plurality of data sources to at least a first data consumer of the plurality of data consumers in accordance with a respective permission level of the at least the first data consumer.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The widespread availability of data among different public and private entities provides numerous opportunities for improving general welfare. However, with data privacy concerns on the rise, and the civil responsibility of government agencies being increasingly scrutinized, the ability to effectively share and distribute services is a continuous challenge. In addition, some data sets lose long-term transparency with short data lifecycles. Specifically, aggregated statistics may be lost or made inaccurate if the raw data expires without planning for future re-use of summarized insights.

Examples of the present disclosure use permanent data sessions or "data sharing communities" within a data sharing platform for data recording and responsible sharing for public welfare applications. In particular, a data sharing community may include data sources as well as data consumers (where a participant, also referred to as a "role" may be both a data source as well as a data consumer). A data sharing community may have an associated event type, and the data sharing community may be instantiated when an event of the event type occurs. The data sharing community may define what types of data may be shared from a plurality of data sources, the format of the data, the shareable portions of the data based on a particular time period or other criteria, and so forth. The data sharing community may also define permissions for which data consumers may access which data, for how long, and so forth.

In one example, data collected for a data sharing community can be automatically aggregated, e.g., periodically, and the underlying raw data deleted from the data sharing community and/or from the data sharing platform, facilitating both anonymized public services and a solution for long-term insight preservation. The data may therefore be searched by contextual priority and parallel data sets (e.g., medical records, registration/property records, licensing records, criminal records, vital statistics, etc.) can be linked without fully decrypting the raw data.

In one example, automated agents or bots may have increased roles and more permissive access to data stored in the session (depending on who owns the agent and/or the purpose of the agent). However, individual data consumers may not need and/or may not be provided this role/level of access. Some automated agents may be granted increased privileges after the initial establishment of a data sharing community by another civil entity that may be a member (e.g., for automated generation of warrants, death notices, etc.), or by a person of interest (e.g., a private citizen may choose to opt-in and share aspects of what may be considered his or her personal information).

Notably, a data session (e.g., a data sharing community) encompassing civil entities, municipal systems (traffic control, Internet of Things (IoT), smart cities, etc.), and other stakeholders benefit from security and immutability of records, and proper access restrictions/permissions and role definitions. IoT and smart sensors can use the data session as a reliable (and authenticated) source for civil data. In addition, automated systems, e.g., for traffic management, may have automatic overrides based on automatically observed events. Security mechanisms built into the data session, such as privileges for restricted data viewing, prevent unnecessary data accesses even among members of the data sharing community. For example, a traffic signal controller should not be able to access criminal records that may be associated with an accident event, and may be restricted from such access by assigning a relevant permission level at the outset.

Examples of the present disclosure may provide for public review of actions taken by various civic entities without endangering the ability of such institutions to operate, may provide for synchronization and verification/authentication of control requests for municipal systems and devices (e.g., traffic, utilities, etc.), may provide for correlation of different data sources in an access-controlled fashion by roles and permissions, may provide a reliable repository for large-form content (video, audio, etc.) that can be easily reconstructed and logged, and may provide for preemptive, context-sensitive controls (time, location, critical need, etc.) for data access from a public data pool.

The data sharing platform may designate some data as public, other data as private, and the rules of sharing and aging-out the data may be defined by the platform in accordance with the rules of data sharing communities that are created (e.g., according to the event type template(s)). Examples of the present disclosure also provide for public researchers to study and aggregate actions of civil entities across time and location from direct data sources. For instance, the data sharing platform may, in accordance with rules of a data sharing community, instantaneously log data relating to an event from IoT and smart city sensors, coordinate the IoT and smart city sensors in an authenticated and auditable fashion, and efficiently and persistently store large-form data as the data correlates with event(s) in an immutable fashion. The data sharing platform may further enable authenticated sharing of rich civic data (e.g., property records, criminal records, medical records, etc.) using role-managed data sessions. These and other aspects of the present disclosure are discussed in greater detail below in connection with the examples of FIGS. 1-4.

Figure 1:
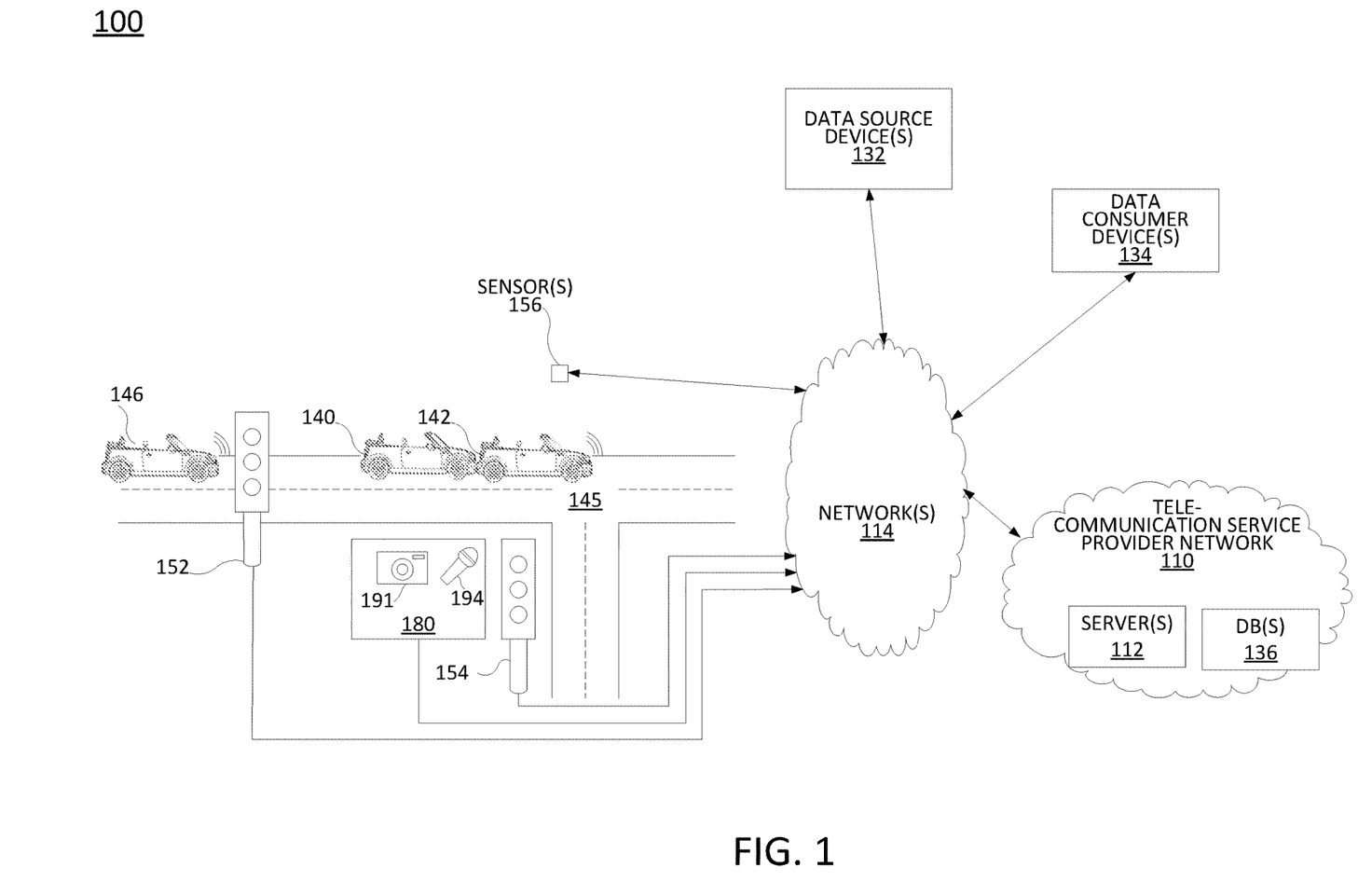
FIG. 1 illustrates an example system related to the present disclosure.

To aid in understanding the present disclosure, FIG. 1 illustrates a block diagram depicting one example of an environment 100 suitable for performing or enabling the steps, functions, operations, and/or features described herein. As illustrated in FIG. 1, the environment 100 includes a telecommunication service provider network 110. In one example, telecommunication service provider network 110 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets. However, it will be appreciated that the present disclosure is equally applicable to other types of data units and transport protocols, such as Frame Relay, and Asynchronous Transfer Mode (ATM). In one example, the telecommunication service provider network 110 uses a network function virtualization infrastructure (NFVI), e.g., host devices or servers that are available as host devices to host virtual machines comprising virtual network functions (VNFs). In other words, at least a portion of the telecommunication service provider network 110 may incorporate software-defined network (SDN) components.

In one example, telecommunication service provider network 110 is connected to networks 114. The networks 114 may include a wireless access network (e.g., an IEEE 802.11/Wi-Fi network and the like), a Wide Area Network (WAN), a cellular access network, such a Universal Mobile Telecommunications System (UMTS) terrestrial radio access network (UTRAN), an evolved UTRAN (eUTRAN), a base station subsystem (BSS), e.g., a Global System for Mobile communication (GSM) radio access network (GRAN), a 2G, 3G, 4G and/or 5G network, a Long Term Evolution (LTE) network, and the like), a circuit switched network (e.g., a public switched telephone network (PSTN)), a cable access network, a digital subscriber line (DSL) network, a metropolitan area network (MAN), other types of wired access networks, an Internet service provider (ISP) network, and the like. Alternatively, or in addition, networks 114 may represent enterprise networks, corporate, governmental, or educational institution LANs, a home/residential LAN, and the like. In one embodiment, the networks 114 may all be different types of networks, may all be the same type of network, or some networks may be of a same type and others may be different types of networks. The access networks 114 and the telecommunication service provider network 110 may be operated by different service providers, the same service provider, or a combination thereof. For instance, in an example where networks 114 include a cellular access network, telecommunication service provider network 110 may include evolved packet core (EPC) network components, network switching subsystem (NSS)/GSM core network and/or General Packet Radio Service (GPRS) core network components, and so forth. The networks 114 (e.g., access networks) and the telecommunication service provider network 110 may be interconnected via one or more intermediary networks (not shown) which may utilize various different protocols and technologies for transporting communications in the form of data packets, datagrams, protocol data units (PDUs), and the like, such as one or more IP/MPLS networks, one or more frame relay networks, one or more ATM networks, and so forth. In one example, the networks 114 may represent the Internet in general.

Further illustrated in FIG. 1 is one or more servers 112 in telecommunication service provider network 110. The server(s) 112 may each comprise all or a portion of a computing device or system, such as computing system 400, and/or processing system 402 as described in connection with FIG. 4 below, specifically configured to perform various steps, functions, and/or operations for establishing a data sharing community for an event of an event type, as described herein. For example, one of server(s) 112, or a plurality of servers 112 collectively, may perform operations in connection with the example method 300, or as otherwise described herein. In one example, the one or more servers 112 may comprise a network-based processing system 210, as described in greater detail below in connection with the example system 200 of FIG. 2.

Figure 4:
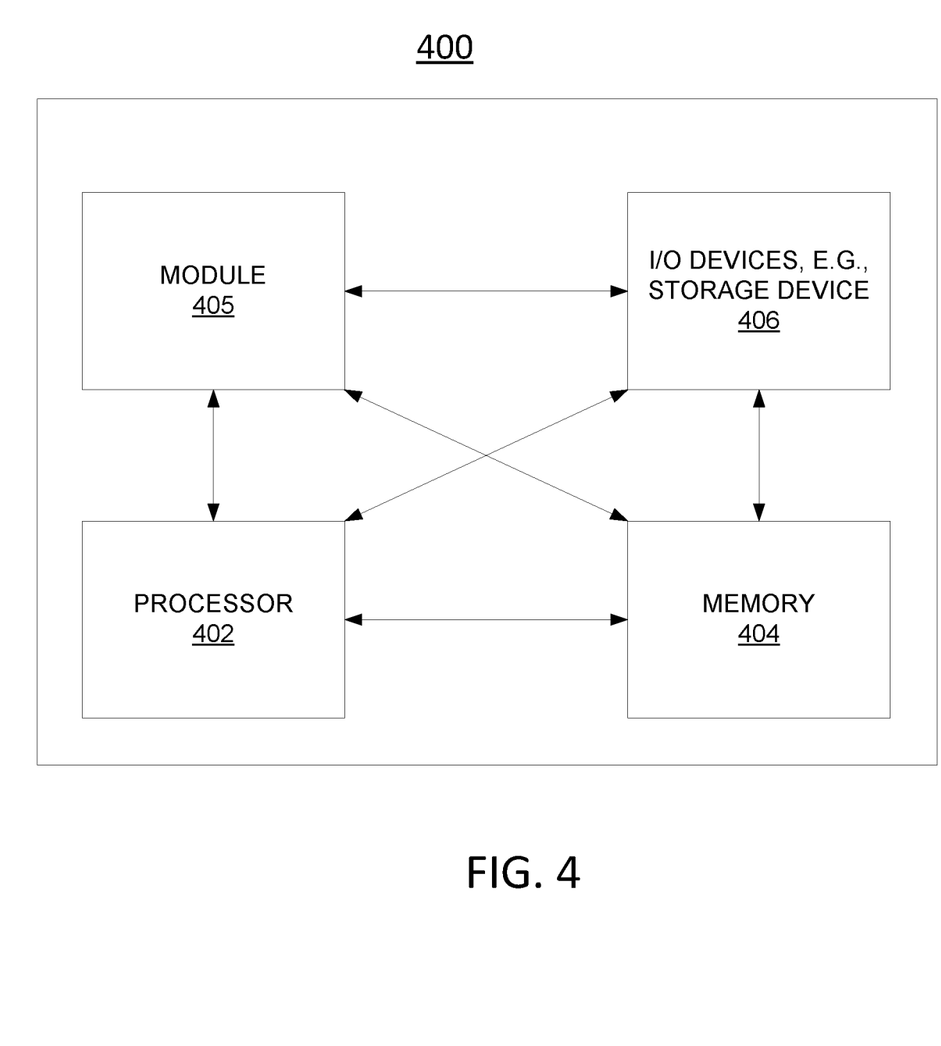
FIG. 4 illustrates an example high-level block diagram of a computing device specifically programmed to perform the steps, functions, blocks, and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, telecommunication service provider network 110 may also include one or more databases (DBs) 136, e.g., physical storage devices integrated with server(s) 112 (e.g., database servers), attached or coupled to the server(s) 112, and/or in remote communication with server(s) 112 to store various types of information in support of systems for establishing a data sharing community for an event of an event type, as described herein. In one example, server(s) 112 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 112, may represent a distributed file system, e.g., a Hadoop® Distributed File System (HDFS™), or the like. In one example, DB(s) 136 in conjunction with one or more of the servers 112, may comprise a data sharing platform 205, as described in greater detail below in connection with the example system 200 of FIG. 2.

In one example, DB(s) 136 may receive and store data for a variety of different data owners and from a variety of different data source devices. The data source devices may include data source device 180, sensor(s) 156, traffic lights (or "traffic signals") 152 and 154, data source devices 132, vehicle 142, and so forth. To illustrate, DB(s) 136 may receive information feeds from one or more data source device(s) 132, such as a weather alert service, a traffic alert service, a public safety alert service, an aggregator alert service, and so on. The information feeds may be in formats such as a SMS/text message-based feed, a Really Simple Syndication (RSS) feed, an email-based feed, and so forth. For instance, one of the data source devices 132 may represent a weather data server (WDS). In one example, the weather data may be received by DB(s) 136 from the data source device(s) 132 via a weather service data feed, e.g., an NWS extensible markup language (XML) data feed, or the like. In another example, the weather data may be obtained by retrieving the weather data from the WDS. Similarly, one of the data source devices 132 may represent a server of a traffic management service and may forward various traffic related data to DB(s) 136, such as toll payment data, records of traffic volume estimates, traffic signal timing information, and so forth. The information feeds may be in formats such as a SMS/text message-based feed, a RSS feed, an email-based feed, and so forth. The information feeds received by DB(s) 136 may all be in a same format or may be in a plurality of different formats.

Data source device(s) 132 may also represent systems providing relatively static information to DB(s) 136, such as an insurance database, a DMV driver database, demographic information of users maintained by a telecommunication network service provider, summary health records, etc. In one example, DB(s) 136 may comprise a primary storage system for data of various data owners. For instance, telecommunication service provider network 110 may store driver records in DB(s) on behalf of a civic entity, e.g., as a cloud storage provider. However, in another example, the data source device(s) 132 may comprise primary storage devices for various static information, whereas a copy, or copies, of such information may be uploaded to DB(s) 136.

The DB(s) 136 may collect and store media content from data source device 180. For example, data source device 180 may include camera 191 (e.g., a video camera, a camera to capture sequences of still images, etc.) and a microphone 194. The data source device 180 may therefore generate streams of media content comprising still images, audio, and/or video. In the present example, DB(s) 136 may receive media content from data source device 180 via one or more of the networks 114.

Similarly, DB(s) 136 may collect and store data from one or more sensors 156. For instance, sensors 156 may include a wind speed sensor periodically supplying wind speed measurements to DB(s) 136. Alternatively, or in addition, sensors 156 may collect measurements continuously, but may only report the measurements in response to a request from DB(s) 136 and/or server(s) 112. For instance, sensors 156 may collect and store 24 hours of measurement data and provide the measurement data upon demand. In one example, DB(s) 136 may also collect and store data from traffic lights 152 and 154, e.g., light timing information. For example, traffic light may have variable light timing and it may be of interest which lights are red, green, yellow, flashing, blinking, etc. at particular times and/or for how long. It should be noted that in one example, traffic signal timing information may be received by DB(s) 136 from data source device(s) 132 comprising server(s) of a traffic management service. However, in another example, the traffic light timing information may be received from the traffic lights 152 and 154 without involvement of the data source device(s) 132.

In one example, vehicle 142 may also comprise a data source device. For instance, vehicle 142 may have an on-board processing system that includes a variety of components, such as a navigation system, a diagnostics system, an entertainment system, a dashboard camera, and so forth, as well as an antenna and wireless transceiver for wireless (e.g., cellular data) communications. Thus, vehicle 142 may also collect a variety of data that may be uploaded to DB(s) 136 via network(s) 114 (e.g., a cellular access network).

In one example, a template for a data sharing community for events of a particular event type may be created by agreement among the various parties and may be stored by DB(s) 136. A template for a data sharing community may include such thing as: at least one trigger condition for events of the event type, a duration of time associated with a detection of the at least one trigger condition for which data from the plurality of data source devices is shareable, data fields of the data which are shareable in connection with events of the event type, permission levels for different data consumers/roles (e.g., the types of data, the data sources, the data fields, etc.) that are shareable in connection with events of the event type, at least one retention time period for retaining the data from the plurality of data sources, an expiration condition for the data sharing community, and so forth.

The parties may include owners of data source devices, such as an owner of one of the data source device 180, sensor(s) 156, traffic lights 152 and 154, data source devices 132, vehicle 142, an owner or custodian of a data set comprising health information, an owner or custodian of a data set comprising demographic information of at least one individual, or an owner of a data set comprising personal information of at least one individual. The parties may further include certain types of data consumers, such as a law enforcement entity, an emergency medical response entity, a civil authority, an insurance entity, a medical entity, a research entity, and so forth. Each of the parties may comprise an accountholder or a stakeholder with respect to a data sharing platform that may be represented by server(s) 112 and DB(s) 136. Thus, a template for a data sharing community is created and may become active in the data sharing platform when agreed to by the various parties. Any one or more of the parties may define the characteristics of the template for the data sharing community and provide the characteristics to DB(s) 136 and/or server(s) 112 for storage and/or for activation of filtering for event detection and data sharing community creation.

The data consumers may be associated with one or more data consumer devices 134. For example, data consumer devices 134 may each comprise a desktop computer and/or personal computer (PC), a mobile device, such as a cellular smart phone, a laptop, a tablet computer, etc., or a plurality or cluster of such devices. The data consumers may include a traffic management service (such as a state or local transportation authority), a police, fire, or emergency medical service, an insurance service, and so on.

It should be noted that some of the data consumers may also comprise data source device owners and/or data set owners. For instance, a traffic management service may control traffic lights 152 and 154, but may also be a recipient of a video feed from vehicle 142 in connection with an event of the event type "traffic accident." Data consumers may also comprise data source devices, such as vehicle 146, which may comprise an ambulance with an on-board processing system that includes a variety of components, such as a navigation system, a diagnostics system, an entertainment system, a dashboard camera, and so forth, as well as an antenna and wireless transceiver for wireless (e.g., cellular data) communications. Thus, vehicle 146 may also collect a variety of data that may be uploaded to DB(s) 136 via network(s) 114 (e.g., a cellular access network). Vehicle 146 may also receive a video feed of vehicle 142, may receive medical summary information for an occupant of vehicle 142, and so forth in connection with an event of the event type "traffic accident."

In one example, DB(s) 136 may also store event detection filters (or event signatures) for detecting triggering conditions for events of particular event types based upon data received from any one or more data source devices (e.g., excluding relatively static data, such as demographic information, driver records, health history, etc.). The event detection filters may be defined by one or more parties by consent and agreement in connection with creating the data sharing community template for events of the event type. In other words, the event detection filters may be created and stored as part of the template for the event type. In one example, the event detection filters may comprise machine learning algorithms (MLAs) trained on data from one or more data sources to identify events of a particular event type. For instance, a first event detection filter may be for detecting vehicular collisions in video feeds, a second event detection filter may be for detecting vehicular collisions from one or more information feeds, and so forth.

In one example, the one or more event detection filters (or event signatures) may be deployed by server(s) 112 to detect events based upon data received from any one or more data source devices. In one example, the server(s) 112 may process the data from data source device(s) before storing the data in DB(s) 136. Alternatively, or in addition, the server(s) 112 may apply the event detection filters to the data already stored in DB(s) 136.

In an illustrative example, an event detection filter may be for identifying traffic accidents in video feeds from cameras directed at roadways. However, it should be understood that events of the event type "traffic accident" may be detected in any number of ways using data from any one or more data sources, e.g., from alerts from one or more of data source devices 132 comprising an online crowd-sourced traffic incident notification application, from an RSS traffic incident data feed from one or more of data source devices 132, and so forth, or using a signature based upon data from multiple sources, e.g., detection via both a video feed and via a traffic alert. For example, the video stream from camera 191 may include imagery of a crash between cars 140 and 142, while a text alert from one of data source devices 132 may state: "accident on 1-95 mile marker 82 reported at 11:15 am."

Returning to the illustrative example of FIG. 1, the camera 191 may be directed at a roadway 145 and may capture a video or a sequence of images which may be relayed to server(s) 112. In the present example, the video stream may include imagery of a crash between cars 140 and 142 that may be detected by applying the event detection filter (e.g., a MLA-based detector). In one example, the MLA may comprise at least one of: a deep neural network (DNN), a generative adversarial network (GAN), or the like. In one example, the machine learning algorithm may further include an exponential smoothing algorithm, (e.g., Holt-Winters triple exponential smoothing) and/or a reinforcement learning algorithm. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on.

In any event, when a portion of a video stream is a match to the event detection filter, the server(s) 112 may then establish a data sharing community for the event in accordance with the event type template. For instance, the server(s) 112 may begin to gather additional data from various data sources (e.g., where the server(s) 112 were not previously collecting such data). Alternatively, or in addition, the server(s) 112 may gather and store data from various data source devices on behalf of various data owners on an ongoing basis. However, the server(s) 112 may then begin to associate some of the previously stored data and/or new data incoming from various data sources with the data sharing community. For instance, where the data may have previously been stored in segregated silos for different data owners, now all or selected portions of the data of various respective data owners may now become available to other participants in accordance with the template for the event type. As just one example, the event type template may include instructions for the server(s) 112 to collect video feed data from vehicles that are detected to be within a certain distance from the location of the traffic accident and/or from the location of the camera 191 via which the traffic accident is detected.

In addition, DB(s) 136 may store medical summary records for various drivers which may generally be stored in a manner that is inaccessible to anyone but the drivers themselves. However, in accordance with the event type template, the server(s) 112 may be authorized to make medical summary records of possible occupants of the vehicles 140 and 142 available to one or more data consumers, such as an emergency medical service. It should be noted that the durations of video feeds, the types of records, the fields of the records, the relevant time periods for various records, and so forth, may all be agreed upon, consented to, and specified in the event type template. In one example, server(s) 112 may apply data transformations to certain source data in accordance with the event type template, such as blurring out non-subject vehicles or individuals in a photograph or video, extracting relevant fields of a database and excluding unnecessary fields, such as educational information from a demographic database when the event type is "traffic accident." In one example, server(s) 112 may copy relevant data from respective data silos of different data owners (e.g., stored in DB(s) 136) into a common data environment for access by participants in the data sharing community (e.g., also stored in DB(s) 136). However, in another example, the data is not copied but is linked to the data sharing community and temporary permissions are granted by server(s) 112 to itself.

In one example, notification of a possible event of the event type may be provided to one or more data consumer devices 134. For example, the notification may be sent in the form of an SMS/text message, an email, an RSS feed, etc. via networks 114, telecommunication service provider network 110, and so forth. In one example, server(s) 112 may also provide access tokens (e.g., Kerberos tickets, or the like) to data consumer devices 134 to access data of the data sharing community. For instance, one of data consumer devices 134 may comprise an emergency medical dispatcher who may receive a notification of a possible traffic accident along with an access token. The particular one of the data consumer devices 134 may then access DB(s) 136 via server 112 to obtain additional data of the data sharing community, e.g., to retrieve a video feed from camera 191, to obtain traffic signal timing information for traffic lights 152 and 154, and so on.

In one example, additional roles/participants may also be added after the initial establishment of the data sharing community. For example, the event type template may indicate that wireless communication equipped vehicles that are opted in to this particular type of data sharing community participation and are detected to be within a certain distance of camera 191 may also be enrolled in the data sharing community as data source devices, data consumers, or both. For example, vehicle 146 may be enrolled to receive notifications of a possible traffic accident ahead. However, the data sharing community may also receive a video feed from a dashcam of vehicle 146 if so equipped. This may be useful to provide another vantage point of the traffic accident, to provide a view of possible traffic backup approaching the location of camera 191 and/or the location of the traffic accident, and so forth. It should be noted that the permission level(s) and hence the quantities and types of data of the data sharing community available to certain data consumers (e.g., individual motorists) may be entirely different from the permission level(s) of insurance services, which may further be different from the permission level(s) of law enforcement entities, and so forth.

Alternatively, or in addition, the event type template may provide for obtaining more or less data from data source devices, and/or changing permission levels for certain data consumers based upon a location. For instance, server(s) 112 may gather into the data sharing community environment video data, audio data, vehicle monitoring data, and so forth for a vehicle detected to be involved in a traffic accident, whereas only video data may be gathered from an additional vehicle that is approaching the location, but which is still somewhat far away. However, as the additional vehicle is detected to be closer than a threshold distance to the location of the traffic accident, the server(s) 112 may then begin to also detect audio data from the additional vehicle, speed data, and so forth.

Similarly, an on-board processing system of a vehicle of emergency response personnel (e.g., vehicle 146) may be enrolled as a data consumer in the data sharing community and may be provided with access to a first level of data comprising more basic information, such as video data from camera 191. However, as the vehicle 146 approaches closer to the scene of the traffic accident between vehicles 140 and 142, the vehicle 146 may then be granted a second permission level where additional data of the data sharing community is accessible to the vehicle 146, such as medical summary information for individuals associated with vehicles 140 and/or 142, vehicle status information of vehicles 140 and/or 142 (e.g., to determine if there is a fuel leak, an engine is still running, etc.), and so forth. Thus, emergency medical response personnel in a general area may all be enrolled as data consumers. However, emergency medical response personnel that appear to actually be responding to the scene may be granted additional access to more substantial and useful information. In addition, certain data consumers and/or data source devices may be removed from the data sharing community prior to the end of the data sharing community. For instance, a vehicle passing a traffic accident may temporarily be enrolled as a data source device and/or a data consumer, but may be removed from the data sharing community (e.g., all permissions revoked) when the vehicle is detected to be a threshold distance away from the location of camera 191 via which the traffic accident was detected in accordance with the event detection filter.

In one example, the event type template may identify one or more conditions for ending a data sharing community for an event of the event type. For instance, a first condition may specify a maximum duration of the data sharing community for a traffic accident, e.g., 12 hours, 24 hours, 48 hours, etc. A second condition may specify that certain participants in the data sharing community may send an instruction to server(s) 112 to end the data sharing community. For instance, a law enforcement entity may be permitted to declare a data sharing community to be ended. In still another example, the data sharing community may end when all or a certain number of participants provide indications to server(s) 112 that the data sharing community should be ended.

In yet another example, a second event detection filter may be associated with a second event type and may be triggered at or near the end of the data sharing community associated with traffic accident. For example, the second event detection filter may detect that the data sharing community is to end, e.g., since a duration of time has passed since the traffic accident was first detected, since one or more participants have declared the data sharing community should end, and so on. However, this may also be a condition for creating the second data sharing community. For example, the first data sharing community may primarily meet the needs of motorists and emergency response personnel in ensuring safety and traffic flow. However, the second data sharing community may be more directed to the administrative needs of the motorists involved in an accident, insurance providers, traffic safety engineers, and so on.

As such, some or all of the data of the first data sharing community may be transferred to the second data sharing community. However, certain data may be omitted, transformed, e.g., summarized, and so forth. For instance, third-party drivers may not want the state or local transportation authority to have open-ended access to dashcam videos from the vehicles of the respective third-party drivers. Thus, this data may be excluded from the second data sharing community. However, the data streams from vehicles 140 and 142 may be retained for insurance settlement, for investigation by traffic safety engineers, etc. If any entity still wants to review video feeds from vehicles of third-party drivers, this data may still be requested. Nevertheless, since the urgency of the actual traffic accident has passed, certain entities are not granted open-ended and unrestricted access to this data.

It should be noted that the environment 100 has been simplified. In other words, the environment 100 may be implemented in a different form than that illustrated in FIG. 1. For example, the environment 100 may be expanded to include additional networks, and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, environment 100 may be altered to omit various elements, substitute elements for devices that perform the same or similar functions and/or combine elements that are illustrated as separate devices.

As just one example, the operations described above with respect to server(s) 112 may alternatively or additionally be performed by a device, or a plurality of devices coupled to network(s) 114. In one example, a first device may process data from data source devices to detect a trigger condition for an event of an event type, a second device may create a data sharing community in accordance with an event type template, a third device may collect data from data sources, and so forth. In addition, an illustrative example is described in connection with a traffic accident event type. However, other, further, and different examples may instead relate to event types such as a premises break-in, overcrowding in a subway station, individuals or vehicles approaching an unmanned gate or other types of barricade, remote detection of a particular type of wildlife, and so forth. Thus, these and other modifications are all contemplated within the scope of the present disclosure.

Figure 2:
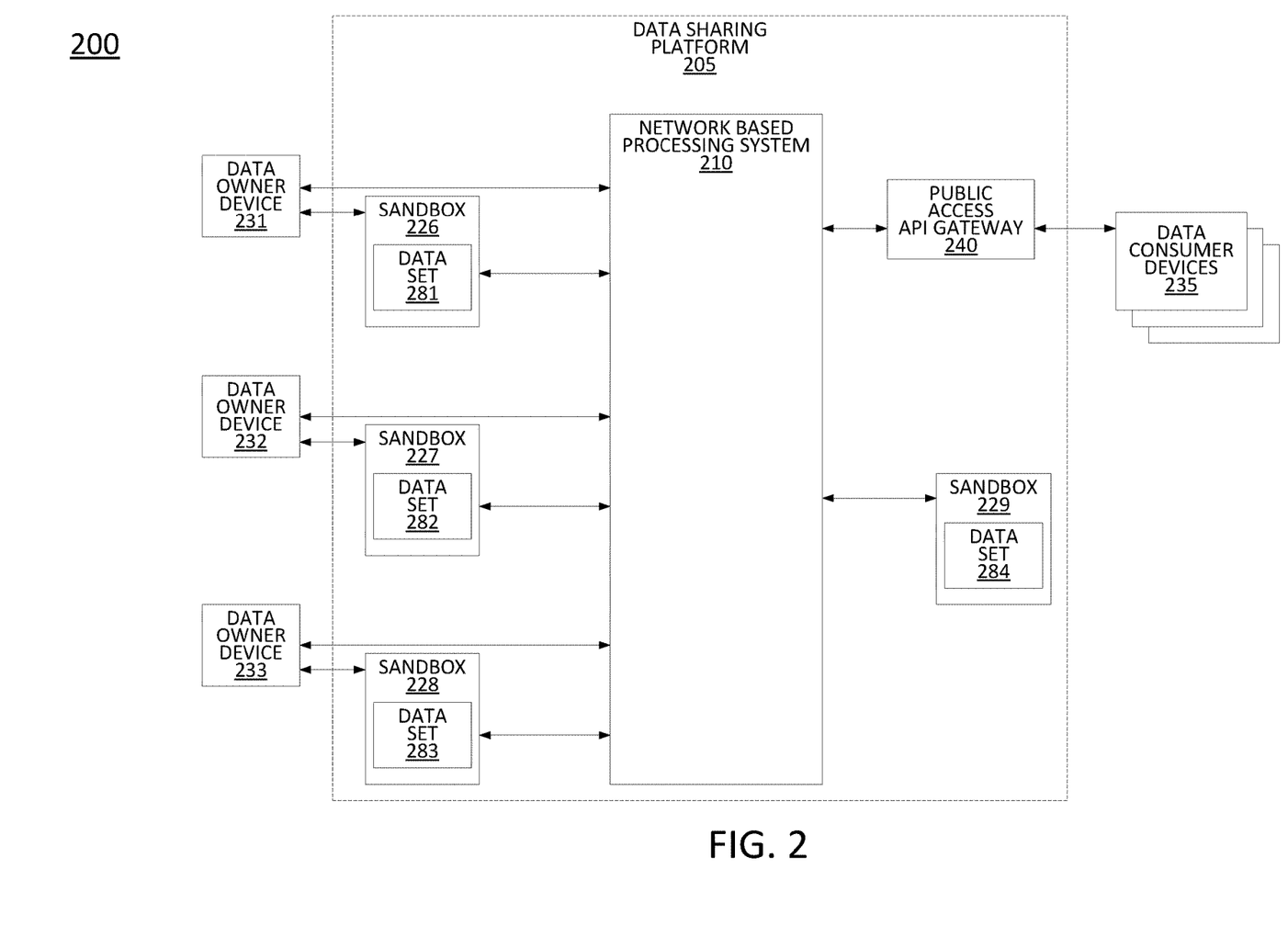
FIG. 2 illustrates an example system including a data sharing platform, according to the present disclosure.

FIG. 2 illustrates an example system 200 including a data sharing platform 205 (e.g., a network-based data sharing platform). In one example, the data sharing platform 205 may comprise a processing system, e.g., a server or multiple servers collectively configured to perform various steps, functions, and/or operations in accordance with the present disclosure. In one example, the data sharing platform 205 includes a network based processing system 210, e.g., a server or multiple servers collectively configured to perform various steps, functions, and/or operations in accordance with the present disclosure. It should also be noted that the components of network based processing system 210 and the data sharing platform 205 may comprise various combinations of computing resources (e.g., processor(s), memory unit(s), and/or storage unit(s)) on the same or different host devices, at the same or different locations (e.g., in the same or different data centers). For example, processors assigned to execute instruction sets for different components may be separate from the associated memory resources, which may be separate from associated storage resources where data sets or other data which may be processed via the different components may be stored, and so on.

As further illustrated in FIG. 2, the data sharing platform 205 includes a plurality of sandboxes 226-229 (e.g., "private sandboxes") and a public access application programming interface (API) gateway 240. In various examples, sandboxes 226-229, the data sets 281-284 stored in the different sandboxes 226-229, and/or the public access API gateway 240, may comprise virtual machines, application containers, or the like operating on one or more host devices. In addition, sandboxes 226-229, the data sets 281-284 stored in the different sandboxes 226-229, and/or the public access API gateway 240 may comprise various combinations of computing resources, e.g., processor(s), memory unit(s), and/or storage unit(s) on one or more shared host devices and/or on separate host devices. Each of the data sets 281-284 may take a variety of different forms, e.g., table-based records, video, audio, documents in various formats, and so forth. However, for non-table based data sets, metadata regarding the various data/records may be maintained in table form. In one example, the data sharing platform 205 may comprise a relational database system (RDBS). However, in other, further, and different examples, data sharing platform 205 may comprise a different type of database system, such as a hierarchical database system, a graph-based database system, etc.

The data sharing platform 205 may provide services to a number of different users, and interact with a number of user devices, such as data owner devices 231-233 and data consumer devices 235. Each of the user devices may comprise a desktop computer, a cellular smart phone, a laptop, a tablet computer, a cloud based processing system providing a user environment, and so forth. In particular, data sharing platform 205 may be operated by a trusted party to store data sets on behalf of data owners in a secure and restricted manner, and to provide data consumers with data sharing community-based access to multiple data sets in accordance with authorizations/permissions from data owners for events of one or more particular event types.

To illustrate, sandbox 226 may store data set 281 for a first data owner, which may comprise medical information for various individuals. The data set 281 may include raw data (e.g., biometric sensor data) and/or may include data that is normalized, transformed, tagged, etc. (e.g., health summary records) before uploading to the data sharing platform 205. In one example, the data in data set 281 may be uploaded via data owner device 231 and stored in sandbox 226. Alternatively, or in addition, the data sharing platform 205 may be configured to obtain and/or receive the data comprising data set 281 directly from biometric sensors of various individuals (not shown). The sandbox 226 may represent a secure data storage and data processing environment that is only accessible to the first data owner (or another person or entity authorized on behalf of the first data owner) and to the data sharing platform 205.

Similarly, sandbox 227 may store data set 282 for a second data owner, which may comprise a vehicular on-board processing system management service. The data set 282 may include raw data and/or may include data that is normalized, transformed, tagged, etc. before uploading to the data sharing platform 205. In one example, the data in data set 282 may be uploaded via data owner device 232 and stored in sandbox 227. Alternatively, or in addition, the data sharing platform 205 may be configured to obtain and/or receive the data comprising data set 282 directly from various vehicular on-board processing systems (not shown). For instance, the data may include dashcam videos, engine diagnostics, entertainment system usage information, fuel status, braking information, tire pressure information, and so forth. The sandbox 227 may represent a secure data storage and data processing environment that is only accessible to the second data owner (or another person or entity authorized on behalf of the second data owner) and to the data sharing platform 205.

In addition, sandbox 228 may store data set 283 for a third data owner, e.g., a traffic management service, which may comprise toll payment data, records of traffic volume estimates, traffic signal timing information, and so forth. The data set 283 may include raw data and/or may include data that is normalized, transformed, tagged, etc. before uploading to the data sharing platform 205. In one example, the data in data set 283 may be uploaded via data owner device 233 and stored in sandbox 228. Alternatively, or in addition, the data sharing platform 205 may be configured to obtain and/or receive the data comprising data set 283 directly from a traffic management system (not shown). The sandbox 228 may represent a secure data storage and data processing environment that is only accessible to the third data owner (or another person or entity authorized on behalf of the third data owner) and to the data sharing platform 205.

In one example, data owners may make portions of data sets 281-283 available to other users of the data sharing platform 205 or to the public at large via data sharing communities. For instance, network-based processing system 210 may run one or more event detection filters for detecting trigger conditions for one or more events. The trigger conditions may be detected via data of any one or more of the data sets 281-283. In one example, owners of data sets 281-283 may grant permission for the network-based processing system 210 to scan all or a portion of the data of the data sets 281-283 for such purposes. In one example, when a trigger condition is detected, network-based processing system 210 may create sandbox 229 for the new data sharing community. In addition, network-based processing system 210 may gather data from any one or more of the data sets 281-283 and copy the data to the data set 284 in sandbox 229. For example, the network-based processing system 210 may access data sets 281-283 to obtain the relevant data, to filter, join, select columns, generate projections, and/or perform other operations in accordance with the event type template. In one example, the network-based processing system 210 is granted read-only access to the data sets 281-283.

It should be noted that data in the data sets 281-283 may have time-based rules for data expiration, data aggregation or summarization, or the like. However, in one example, the occurrence of an event, and hence the establishment of a data sharing community, may cause various data of the data sets 281-283 to be maintained in a particular format and/or retained in the data sharing platform 205 for longer than would otherwise be the case. In one example, the network-based processing system 210 may also begin to gather new data from external data sources when a data sharing community is established. For instance, data owner device 233 may not typically upload data to the data sharing platform 205. However, the owner of data owner device 233 may have agreed to contribute data in connection with a particular data sharing community (e.g., when the trigger condition for establishing the data sharing community is encountered). Thus, in one example, the network-based processing system 210 may create sandbox 228 and begin populating data set 283 with data from data owner device 233. This may be performed as an alternative or in addition to logging data into data set 284 of sandbox 229 that is created exclusively for the data sharing community when the data sharing community is initially established. In one example, the network-based processing system 210 may further apply transformations to the data in accordance with the event type template, e.g., identifying individuals, license plates, etc. in a photograph or video and blurring out or blocking faces, license plates, etc., anonymizing fields in a database, excluding certain rows or columns of data, extracting records for certain time periods and omitting the remainder, and so forth.

In one example, network-based processing system 210 may also provide via the public access API gateway 240 one or more tickets (e.g., a Kerberos ticket, an X.509 certificate, or the like), to allow data consumer devices 235 to access the sandbox 229 and/or data set 284 to retrieve the relevant data associated with the event. In one example, network-based processing system 210 may also push data from data set 284 (e.g., data collected from data sets 281-283 and/or from external data source devices of the data sharing community in accordance with the event type template) to data consumer devices 235 in accordance with the event type template. Alternatively, or in addition, data consumers, via data consumer devices 235 may subscribe to certain aspects of data set 284 when initially using a ticket to access the data sharing community (e.g., to access sandbox 229 and/or data set 284). For example, a first data consumer may want to receive any video feeds that are available in real time while a second data consumer may want to receive biometric data of certain individuals in real time.

It should also be noted that one or more of the data consumer devices 235 may comprise an automated agent or bot, such as a device running an application (e.g., a MLA) for detecting certain conditions, for providing alerts, notification, or control signals in response to such conditions, and so forth. For example, one of data consumer devices 235 may be able to detect vehicle license plates in images or videos, to perform image pattern matching to determine the license plates' states, to perform optical character recognition on detected license plates to determine the license plate numbers, and so forth. Various additional data consumer devices 235 may comprise automated agents/bots of a same or a similar nature. In addition, in one example, one or more of the consumer devices 235 may also be enrolled as a data source device. For example, one of the consumer devices 235 for determining states and plate number of license plates may also provide the results back to the data sharing community as additional data to be aggregated in data set 284. Similarly, one or more of the data owner devices 231-233 may also be enrolled as both a data source device and a data consumer. For instance, an on-board processing system of a police vehicle may contribute video data from a dashcam, and may also receive access to detected license plate information, medical information, and so forth as a data consumer, either by permitted access upon request, e.g., using an access token, and/or or via proactive push transfer of new data.

In one example, one or more of the data consumer devices 235 may comprise an automated management system, e.g., for traffic signals, electrical power distribution, and so forth. For instance, in one example, one of the data consumer devices 235 may receive speed information from one or more vehicles on the same roadway as a traffic accident and/or on nearby roadways, calculate the distance that traffic may be backed-up on the same roadway, calculate a capacity of one or more nearby roadways to alleviate the congestion, and control one or more automated traffic signals (e.g., traffic lights, overhead text information screens, etc.) to reroute traffic. For instance, one of the data consumer devices 235 may transmit a notification or instructions, or may otherwise cause a traffic signal to display an alert, to display detour instructions, etc. For instance, a traffic signal may change from a green light to a blinking yellow or red light to signal caution to motorists. In another example, a traffic signal, e.g., a roadway sign, may display text such as "possible accident ahead—slow down and use caution." In still another example, a speed limit may be reduced in an area near the incident. In one example, the traffic signals may originate from one or more of the data owner devices 231-233. Alternatively, or in addition, the traffic signals may originate from other devices (not shown) that do not contribute data to the data sharing community as data source devices.

It should also be noted that the example of FIG. 2 is provided only as an illustrative example. In other words, in other, further, and different examples, the data sharing platform 205 may comprise a different architecture. For instance, operations that are described as being performing in connection with one component may alternatively or additional be performed by a different component. In addition, while the data sets 281-284 are illustrated as residing within sandboxes 226-229, it should be noted that the actual storage of data sets 281-284 may be distributed in a plurality of different storage devices which may reside within a plurality of different physical locations, where the sandboxes 226-228 comprise environments where the respective data sets 281-283 can be fully or partially accessed. For example, sandboxes 226-229 may each represent at least a portion of a respective user application provided to data owner devices 231-233 via the data sharing platform 205. For instance, the user applications may run on network-based processors and memory units of data sharing platform 205, where the sandboxes 226-228 may possess security tokens (e.g., decryption keys) for rendering data sets 281-283, respectively. Thus, the storage locations of the data sets 281-283 may be arbitrary, and the data owner devices 231-233 and data consumer devices 235 may interact with the data sets 281-284, perform data analysis, visualizations, and so forth via the respective user applications hosted by the hardware of data sharing platform 205. In one example, data sets 281-284 may be part of a set of file stores such as a Hadoop Distributed File System (HDFS) and/or another cloud file storage system. Thus, these and other variations, modifications, and/or enhancements, are all contemplated within the scope of the present disclosure.

Figure 3:
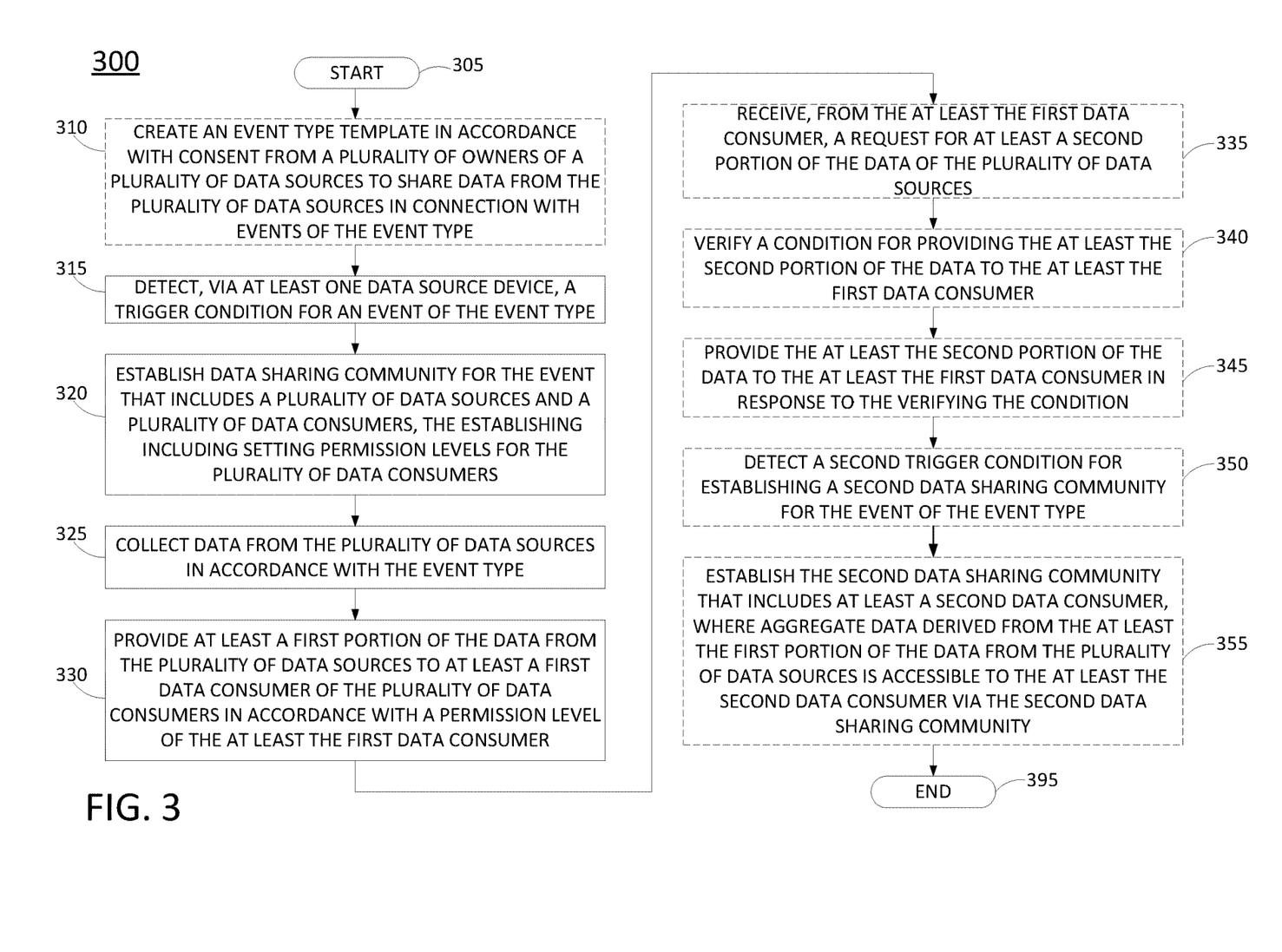
FIG. 3 illustrates a flowchart of an example method for establishing a data sharing community for an event of an event type, in accordance with the present disclosure.

FIG. 3 illustrates a flowchart of an example method 300 for providing a notification of an anomaly in a media content that is associated with an event type. In one example, steps, functions and/or operations of the method 300 may be performed by a device as illustrated in FIG. 1, e.g., one or more of servers 112, or by a network-based processing system 210 as illustrated in FIG. 2. Alternatively, or in addition, the steps, functions and/or operations of the method 300 may be performed by a processing system collectively comprising a plurality of devices as illustrated in FIG. 1 such as one or more of servers 112, DB(s) 136, data source devices 132 and 180, vehicle 142, traffic lights 152 and 154, and so forth, or as illustrated in FIG. 2, such as network based processing system 210, data sharing platform 205, data owner devices 231-233, data consumer devices 235, and so forth. In one example, the steps, functions, or operations of method 300 may be performed by a computing device or processing system 400, and/or processor 402 as described in connection with FIG. 4 below. In one example, the steps, functions, or operations of method 300 may be performed by a computing device or system 400, and/or a processing system 402 as described in connection with FIG. 4 below. For instance, the computing device 400 may represent at least a portion of a platform, a server, a system, and so forth, in accordance with the present disclosure. For illustrative purposes, the method 300 is described in greater detail below in connection with an example performed by a processing system. The method 300 begins in step 305 and may proceed to step 310 or to optional step 315.

At optional step 310, the processing system may create a template for an event type in accordance with consent from a plurality of owners of a plurality of data sources to share data from the plurality of data sources in connection with events of the event type. The consent may establish the event type template, which may include at least one trigger condition for events of the event type, a duration of time associated with a detection of the at least one trigger condition for which the data from the plurality of data sources is shareable, data fields of the data which are shareable in connection with events of the event type, and permission levels for a plurality of data consumers in connection with events of the event type. The consent may further establish the event type template to include at least one of: at least one retention time period for retaining the data from the plurality of data sources or an expiration condition for the data sharing community. The expiration condition may comprise a particular time, a duration of time since the creation, or may comprise a signal from one or more of the data consumers (e.g., an authorized data consumer) to end the data sharing community. For example, a police entity may be authorized to signal the end of the data sharing community.

At step 315, the processing system detects, via at least one data source device, a trigger condition for an event of an event type. In one example, the trigger condition may be based upon sensor data (e.g., on/off, measurement value exceeded, etc.) or may be in accordance with one or more automated agents, e.g., a machine learning algorithm (MLA) to detect a traffic incident, the presence of a vehicle, the presence of an individual, etc. from an image or video feed, to detect an environmental condition, e.g., from sensor data from a plurality of sensors and/or from an image, sound, and/or video feed, and so forth. In one example, the trigger condition may be in accordance with an event type template (e.g., an event type template that may be created at optional step 310).

At step 320, the processing system establishes a data sharing community for the event. The data sharing community may comprise a plurality of data sources, e.g., including the at least one data source device via which the trigger condition is detected, and a plurality of data consumers. In one example, step 320 includes setting permission levels for the plurality of data consumers. In one example, the data sharing community is established in accordance with an event type template (e.g., an event type template that may be created at optional step 310). The plurality of data sources may include, for example: at least one video source device, at least one audio source device, at least one image source device, at least one biometric sensor device, or at least one environmental sensor device. The plurality of data sources may alternatively or additionally include: at least one data set comprising health information of at least one individual, at least one data set comprising demographic information of at least one individual, or at least one data set comprising personal information of at least one individual. In one example, the processing system may store data belonging to individual data owners/users. The processing system may also store personal information of a third-party data owner on behalf of individual users, e.g., a fitness tracking service provider, a telecommunications service provider, an insurance company, a motor vehicle commission, and so on.

In one example, the event type may comprise a traffic incident (e.g., a traffic accident, an abandoned object on a roadway, an animal on a roadway, and so on) and the plurality of data consumers may include at least one of: a law enforcement entity, an emergency medical response entity, a civil authority (e.g., a public or private organization responsible for a roadway associated with the traffic incident), an insurance entity, a medical entity (e.g., a hospital, a doctor, an emergency medical technician (EMT), etc.), or a research entity (e.g., a researcher interested in traffic management, highway safety, emergency medical response outcomes, and so forth). In addition, in an example where the event type comprises a traffic incident, the plurality of data consumers may include at least one of: a controllable roadway resource, a vehicular navigation system of at least one vehicle, or an automated agent (e.g., an MLA) for processing the at least the first portion of the data. For example, an automated agent may be automatically joined to an event/data sharing community for various purposes, such as to verify that a particular user's car is at a particular location, to notify others who may not be participants in the data sharing community of the occurrence of the event via various means, such as a radio broadcast alert, a text message cellular broadcast alert, and so forth.

In one example, the establishing of the data sharing community may comprise identifying at least one location of at least one of the plurality of data sources, and including the at least one of the plurality of data sources in the data sharing community when the at least one location is within a threshold distance from a location of the event. For example, a traffic incident may be detected via a first camera directed at a roadway. Then, additional cameras nearby that are directed at the same roadway or nearby roadways may be enrolled as data source devices in the data sharing community. However, available cameras that might be included in other data sharing communities may be omitted from selection when deemed too far away from the event to be relevant. In one example, the threshold distance-based criteria for including a data source in the data sharing community applies to data source devices with active feeds, such as video cameras, biometric sensor devices, etc., but does not relate to data sources with relatively static information, such as an insurance database, a driver database, demographic information of users maintained by a telecommunication network service provider, etc.

At step 325, the processing system collects data from the plurality of data sources in accordance with the event type (e.g., based upon a template for the event type that may be created at optional step 310). In one example, step 325 may include gathering data from the data source device via which the event is detected, and gathering data from one or more additional data sources. In one example, step 325 may comprise retaining data from the plurality of data sources for a duration of time in excess of a default retention period. For example, if the processing system typically retains only 48 hours of video in accordance with the configuration of the data owner, the processing system may instead may keep selected portions of the data for longer if deemed relevant to the event (e.g., in accordance with the event type template and per the consent of the data owner).

Alternatively, or in addition, step 325 may involve storing data that would not otherwise be stored. For example, a video camera may not typically provide streaming video for storage by the processing system. However, according to the consent of the owner of the video camera, the video camera may be enrolled as a data source device for events of the event type. Thus, there may be no data sharing in general for the particular video camera, but this may be altered for traffic accidents while remaining in accordance with data owner restrictions (e.g., to only retain until the event is ended, to anonymize portions of the video, etc.). In one example, the processing system is granted consent to store data sets on behalf of a plurality of owners of the plurality of data sources and the data sets in accordance with the event type. In one example, the data from the plurality of data sources is stored by the processing system in separate data sets for each of the plurality of owners of the plurality of data sources, where each of the separate data sets is accessible to a respective one of the plurality of owners and is inaccessible to others of the plurality of owners.

In one example, step 325 may comprise anonymizing at least a first portion of the data from the plurality of data sources. For instance, when the at least the first portion of the data comprises images or a video, the anonymizing may comprise obfuscating at least a portion of the images or the video, such as blurring or blocking out vehicles, license plates, people who are not related to the event, children, etc. In one example, the anonymizing may include obfuscating data (e.g., randomizing within a range), or deleting or omitting certain fields, rows, columns, entries, etc. For instance, the at least the first portion of the data may comprise personally identifiable information (e.g., a name, an email, a social security number, a driver's license number, a birthdate, etc.), demographic information (such as gender, height, weight, race, age, education, income, assets, etc.), or biometric information (such as heart rate, temperature, blood pressure, skin conductance, etc.).

At step 330, the processing system provides at least a first portion of the data from the plurality of data sources to at least a first data consumer of the plurality of data consumers in accordance with a permission level of the at least the first data consumer. In one example, the processing system may provide the at least the first portion of the data upon receiving a request from the first data consumer. Alternatively, or in addition, the processing system may provide the at least the first portion of the data to the first data consumer according to a push notification model. In one example, at least one of the data sources may also be one of the data consumers, e.g., an in-vehicle computing system may provide dashcam video footage, and the in-vehicle computing system may also receive data from the processing system as a data consumer, e.g., to aid in navigating around the event.

At optional step 335, the processing system may receive, from the at least the first data consumer, a request for at least a second portion of the data of the plurality of data sources. For example, the at least the second portion of the data may comprise data that is not shareable in accordance with the permission level of the at least the first data consumer at the time of the providing of the at least the first portion of the data.

At optional step 340, the processing system may verify a condition for providing the at least the second portion of the data to the at least the first data consumer. For example, the condition may comprise a distance of the at least the first data consumer to a location of the event. To illustrate, an event type template for the event may indicate that general information may be provided to all EMT, fire, and/or police entities within a given range, but may provide more detailed information to personnel who actually respond to the incident and are detected to be at or very near to the location, such as blood type information, driving records, arrest records, current biometric information of vehicle occupants, pedestrians, or bystanders at the scene, etc.

In one example, the condition may comprise receiving an affirmation from the at least the first data consumer of an emergency situation. For example, consent from data owners may provide for limited sharing for an event. However, when an emergency condition exists, the data owners may allow more open sharing, but only when an affirmation (which is recordable and reproducible) is provided by a data consumer that is authorized to make such an affirmation (and to request and to receive the at least second portion of the data). For instance, EMT, police, and fire personnel may get blood type information, biometric information, and other health information in an emergency, but this information may not similarly be released to an insurance company, other motorists on the roadway, etc. via the processing system. Likewise, an insurance company may not be authorized to declare an emergency and may not receive this information even when one of the other data consumers does declare an emergency.

At optional step 345, the processing system may provide the at least the second portion of the data to the at least the first data consumer in response to the verifying the condition. In one example, the processing system may establish a push notification model to provide a feed comprising the at least the second portion of the data to the at least the first data consumer. For instance, the at least the first data consumer may be provided, at a device of the at least the first data consumer, a video feed, a biometric data feed, etc. in real-time (e.g., at the speed at which the processing system is capable of obtaining the at least the second portion of the data and providing the at least the second portion of the data to the device, accounting for normal processing delays, network delay, etc.).

At optional step 350, the processing system may detect a second trigger condition for establishing a second data sharing community for the event of the event type. For example, the second trigger condition may comprise receiving declarations from one or more of the data consumers that the event ended, e.g., via a message to the processing system via a user interface of a device of the one or more of the data consumers. In another example, the second trigger condition may comprise detecting that a traffic incident has been resolved, e.g., detecting smooth-flowing traffic at a normal/average speed per vehicle, etc.

At optional step 355, the processing system may establish the second data sharing community, where the second data sharing community may include at least a second data consumer. In one example, the processing system may collect and/or store aggregate data derived from the at least a first portion of the data from the plurality of data sources. Thus, the aggregate data may be accessible to the at least the second data consumer via the second data sharing community. In one example, the data can be anonymized to be shared for additional public study, such as statistics regarding what happened, demographics of involved parties, etc. For example, the processing system may create the second data sharing community to publish the aggregate data for study by one or more researchers. However, it should be noted that in one example, the establishment of the second data sharing community does not necessarily limit the publication of anonymized aggregate data to a public data set.

Following step 330, or optional steps 345 or 355, the method 300 may proceed to step 395. At step 395, the method 300 ends.

It should be noted that the method 300 may be expanded to include additional steps or may be modified to include additional operations with respect to the steps outlined above. For example, the method 300 may be expanded to include repeating steps 325 and 330 through multiple iterations. In another example, the method 300 may be expanded to include receiving a request for additional data of one or more data sources, submitting the request to one or more of the data owners, receiving authorizations to release the data, and providing the data to the requesting data consumer in accordance with the permission. In still another example, the method 300 may be expanded to include ending the first data sharing community upon one or more conditions. It should be noted that when the first data sharing community ends, data retained in connection therewith may be deleted, or the data may be protected for a time and then declassified. After the event, devices such as controllable roadway resources may then be put back into configurations as before the event. In addition, data collection and/or data retention may revert to default settings for one or more of the data sources. Thus, these and other modifications are all contemplated within the scope of the present disclosure.

In addition, it should be noted that although not specifically specified, one or more steps, functions or operations of the method 300 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 may comprise optional steps, or can be combined, separated, and/or performed in a different order from that described above, without departing from the example embodiments of the present disclosure.

Furthermore, the capturing and dissemination of any of the captured video, audio, and/or other data are only performed in full compliance with the pertinent privacy rules and policies that are in effect at the time. In other words, the captured likenesses, identities, personal information, and so forth of any individuals would only be done with the permission of the individuals (e.g., opting-into a service with full notice of the potential actions of capturing and dissemination of such data) or as permitted by law.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for establishing a data sharing community for an event of an event type, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 406 may also include antenna elements, transceivers, power units, and so forth. Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the above method 300, or the entire method 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one example, instructions and data for the present module or process 405 for establishing a data sharing community for an event of an event type (e.g., a software program comprising computer-executable instructions) can be loaded into memory 404 and executed by hardware processor element 402 to implement the steps, functions, or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for establishing a data sharing community for an event of an event type (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   detecting, by a processing system including at least one processor via at least one data source device, a first trigger condition for an event of an event type;
   establishing, by the processing system in response to the detecting of the first trigger condition, a first data sharing community for the event, wherein the first data sharing community comprises a plurality of data sources and a plurality of data consumers, wherein at least one of the plurality of data sources also comprises at least one of the plurality of data consumers, wherein the establishing includes:
   identifying at least one location of the at least one of the plurality of data sources;
   including the at least one of the plurality of data sources in the first data sharing community when the at least one location is within a threshold distance from a location of the event; and
   setting respective permission levels for the plurality of data consumers, wherein the plurality of data sources includes:
      the at least one data source device, wherein the at least one data source device comprises at least one video source device;
      at least one data set comprising health information of at least one individual; and
      at least one data set comprising personal information of the at least one individual;
   collecting, by the processing system, data from the plurality of data sources in accordance with the event type;
   providing, by the processing system, at least a first portion of the data from the plurality of data sources to at least a first data consumer of the plurality of data consumers in accordance with a respective permission level of the at least the first data consumer;
   detecting, by the processing system, a second trigger condition for establishing a second data sharing community for the event of the event type, wherein the second trigger condition is different from the first trigger condition; and
   establishing, by the processing system in response to the detecting of the second trigger condition, the second data sharing community, wherein the second data sharing community includes at least a second data consumer, wherein aggregate data derived from the at least the first portion of the data from the plurality of data sources is accessible to the at least the second data consumer via the second data sharing community, and wherein the at least the first portion of the data from the plurality of data sources is excluded from access by the second data sharing community, wherein the second data sharing community differs from the first data sharing community by at least one consumer, and wherein the second data sharing community is established after the first data sharing community.

2. The method of claim 1, wherein the collecting comprises retaining the data from the plurality of data sources for a duration of time in excess of a default retention period.

3. The method of claim 1, wherein the processing system is granted a consent to store data sets on behalf of a plurality of owners of the plurality of data sources and to access the data sets in accordance with the event type.

4. The method of claim 1, further comprising:
   creating an event type template in accordance with a consent from a plurality of owners of the plurality of data sources to share the data from the plurality of data sources in connection with additional events of the event type.

5. The method of claim 4, wherein the consent establishes:
   at least one trigger condition for the additional events of the event type, the at least one trigger condition including the trigger condition;

a duration of time associated with a detection of the at least one trigger condition for which the data from the plurality of data sources is shareable;

data fields of the data which are shareable in connection with the additional events of the event type; and the respective permission levels for the plurality of data consumers in connection with the additional events of the event type.

6. The method of claim 5, wherein the consent further establishes at least one of:

at least one retention time period for retaining the data from the plurality of data sources; or an expiration condition for the first data sharing community.

7. The method of claim 4, wherein the data from the plurality of data sources is stored by the processing system in separate data sets for each of the plurality of owners of the plurality of data sources, wherein each of the separate data sets is accessible to a respective one of the plurality of owners and is inaccessible to others of the plurality of owners.

8. The method of claim 7, wherein the collecting further comprises:

anonymizing the at least the first portion of the data from the plurality of data sources.

9. The method of claim 8, wherein the at least the first portion of the data comprises still images or a video, wherein the anonymizing comprises:

obfuscating at least a portion of the still images or the video.

10. The method of claim 1, wherein the plurality of data sources further includes:

at least one audio source device;
at least one image source device;
at least one biometric sensor device;
at least one environmental sensor device; or
at least one data set comprising demographic information of the at least one individual.

11. The method of claim 1, wherein the event type comprises a traffic incident, wherein the plurality of data consumers includes at least one of:

a law enforcement entity;
an emergency medical response entity;
a civil authority;
an insurance entity;
a medical entity; or
a research entity.

12. The method of claim 1, wherein the event type comprises a traffic incident, wherein the plurality of data consumers includes at least one of:

a controllable roadway resource;
an on-board processing system of at least one vehicle; or
a machine learning algorithm for processing the at least the first portion of the data.

13. The method of claim 1, further comprising:

receiving, from the at least the first data consumer, a request for at least a second portion of the data of the plurality of data sources;

verifying a condition for providing the at least the second portion of the data to the at least the first data consumer; and providing the at least the second portion of the data to the at least the first data consumer in response to the verifying the condition.

14. The method of claim 13, wherein the at least the second portion of the data is not shareable in accordance with the respective permission level of the at least the first data consumer at a time of the providing the at least the first portion of the data.

15. The method of claim 13, wherein the condition comprises a distance of the at least the first data consumer to a location of the event.

16. The method of claim 13, wherein the condition comprises receiving an affirmation from the at least the first data consumer of an emergency situation.

17. A non-transitory computer-readable medium storing instructions which, when executed by a processing system including at least one processor, cause the processing system to perform operations, the operations comprising:

detecting, via at least one data source device, a first trigger condition for an event of an event type;

establishing, in response to the detecting of the first trigger condition, a first data sharing community for the event, wherein the first data sharing community comprises a plurality of data sources and a plurality of data consumers, wherein at least one of the plurality of data sources also comprises at least one of the plurality of data consumers, wherein the establishing includes:

identifying at least one location of the at least one of the plurality of data sources;

including the at least one of the plurality of data sources in the first data sharing community when the at least one location is within a threshold distance from a location of the event; and setting respective permission levels for the plurality of data consumers, wherein the plurality of data sources includes:

the at least one data source device, wherein the at least one data source device comprises at least one video source device;

at least one data set comprising health information of at least one individual; and at least one data set comprising personal information of the at least one individual;

collecting data from the plurality of data sources in accordance with the event type;

providing at least a first portion of the data from the plurality of data sources to at least a first data consumer of the plurality of data consumers in accordance with a respective permission level of the at least the first data consumer;

detecting a second trigger condition for establishing a second data sharing community for the event of the event type, wherein the second trigger condition is different from the first trigger condition; and establishing, in response to the detecting of the second trigger condition, the second data sharing community, wherein the second data sharing community includes at least a second data consumer, wherein aggregate data derived from the at least the first portion of the data from the plurality of data sources is accessible to the at least the second data consumer via the second data sharing community, and wherein the at least the first portion of the data from the plurality of data sources is excluded from access by the second data sharing community, wherein the second data sharing community differs from the first data sharing community by at least one consumer, and wherein the second data sharing community is established after the first data sharing community.

18. A device comprising:

a processing system including at least one processor; and a computer-readable medium storing instructions which, when executed by the processing system, cause the processing system to perform operations, the operations comprising:

detecting, via at least one data source device, a first trigger condition for an event of an event type;

establishing, in response to the detecting of the first trigger condition, a first data sharing community for the event, wherein the first data sharing community comprises a plurality of data sources and a plurality of data consumers, wherein at least one of the plurality of data sources also comprises at least one of the plurality of data consumers, wherein the establishing includes:

identifying at least one location of the at least one of the plurality of data sources;

including the at least one of the plurality of data sources in the first data sharing community when the at least one location is within a threshold distance from a location of the event; and         setting respective permission levels for the plurality of data consumers, wherein the plurality of data sources includes:

the at least one data source device, wherein the at least one data source device comprises at least one video source device;

at least one data set comprising health information of at least one individual; and             at least one data set comprising personal information of the at least one individual;

collecting data from the plurality of data sources in accordance with the event type;

providing at least a first portion of the data from the plurality of data sources to at least a first data consumer of the plurality of data consumers in accordance with a respective permission level of the at least the first data consumer;

detecting a second trigger condition for establishing a second data sharing community for the event of the event type, wherein the second trigger condition is different from the first trigger condition; and     establishing, in response to the detecting of the second trigger condition, the second data sharing community, wherein the second data sharing community includes at least a second data consumer, wherein aggregate data derived from the at least the first portion of the data from the plurality of data sources is accessible to the at least the second data consumer via the second data sharing community, and wherein the at least the first portion of the data from the plurality of data sources is excluded from access by the second data sharing community, wherein the second data sharing community differs from the first data sharing community by at least one consumer, and wherein the second data sharing community is established after the first data sharing community.

19. The device of claim 18, wherein the collecting comprises retaining the data from the plurality of data sources for a duration of time in excess of a default retention period.

20. The device of claim 18, wherein the device is granted a consent to store data sets on behalf of a plurality of owners of the plurality of data sources and to access the data sets in accordance with the event type.

\* \* \* \* \*